United States Patent
Sudhakar

(10) Patent No.: US 8,880,820 B2
(45) Date of Patent: Nov. 4, 2014

(54) TECHNIQUES FOR USING SPARSE FILES DURING SNAPSHOTS

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 365 days.

(21) Appl. No.: 12/877,186

(22) Filed: Sep. 8, 2010

(65) Prior Publication Data
US 2012/0060005 A1 Mar. 8, 2012

(51) Int. Cl.
G06F 12/00 (2006.01)
G06F 13/00 (2006.01)
G06F 13/28 (2006.01)
G06F 3/06 (2006.01)
G06F 11/14 (2006.01)

(52) U.S. Cl.
CPC .............. *G06F 3/065* (2013.01); *G06F 3/0608* (2013.01); *G06F 2201/84* (2013.01); *G06F 11/1466* (2013.01); *G06F 3/067* (2013.01)
USPC ........................................................ 711/162

(58) Field of Classification Search
CPC ....... G06F 3/0608; G06F 3/065; G06F 3/067; G06F 11/1466; G06F 2201/84
USPC ........................................................ 711/162
See application file for complete search history.

(56) References Cited

U.S. PATENT DOCUMENTS

| | | | |
|---|---|---|---|
| 6,748,504 B2 * | 6/2004 | Sawdon et al. | 711/162 |
| 7,395,278 B2 | 7/2008 | Zwilling et al. | |
| 7,395,378 B1 | 7/2008 | Pendharkar et al. | |
| 7,426,618 B2 * | 9/2008 | Vu et al. | 711/162 |
| 7,627,615 B2 | 12/2009 | McMahon | |
| 7,870,356 B1 * | 1/2011 | Veeraswamy et al. | 711/162 |
| 2005/0004925 A1 | 1/2005 | Stahl et al. | |
| 2009/0248984 A1 | 10/2009 | Shen et al. | |
| 2010/0250493 A1 * | 9/2010 | Adkins et al. | 707/639 |

OTHER PUBLICATIONS

Kalen Delaney, Paul Randal, Kimberly Tripp, Conor Cunningham, Microsoft SWL SErver 2008 Internals, Database Snapshots, Microsoft Press, Mar. 11, 2009.*
How Database Snapshots Work, SQL Server 2005, MSDN Library, Dec. 12, 2006. http://msdn.microsoft.com/en-us/library/ms187054(d=printer,v=sql.90).aspx.*

* cited by examiner

*Primary Examiner* — Matthew Bradley
*Assistant Examiner* — Rocio Del Mar Perez-Velez
(74) *Attorney, Agent, or Firm* — Schwegman Lundberg & Woessner, P.A.

(57) ABSTRACT

Techniques for using sparse files during snapshots are provided. Snapshots are managed and maintained for a source volume via sparse files. Metadata defines the sparse files and operations of a file system are used to create, define, and manipulate the metadata. When a write operation is detected during a snapshot, sparse files are used to copy the write operation before the write operation is performed on the source volume; the sparse files server as the snapshot data.

20 Claims, 3 Drawing Sheets

TECHNIQUES FOR USING SPARSE FILES DURING SNAPSHOTS

BACKGROUND

Enterprises go to great lengths to ensure that their data is properly backed up and always available online. Information has become the lifeblood of organizations and any access downtime whatsoever is problematic.

In addition, many times an organization wants to maintain versions of its information so that desired states of the information can be acquired as needed. States of data or information is generally handled via snapshot technology.

To avoid delays associated with accessing primary data when that primary data is being backed up, enterprises will back up snapshots of the primary data, which are being maintained as read-only copies of the primary data. So, access to the primary data is always available even when the primary data is being actively backed up because the backup occurs off a snapshot.

A snapshot of a disk volume takes the original volume (origin or source) and a second volume as inputs and creates a new snapshot volume, which is a virtual volume that uses both of these volumes underneath for its operations. This second volume is often referred to as a "Copy On Write" (COW) device. When there are multiple snapshots for the same origin volume then the complexity to manage the COW devices grows and many problems are encountered.

Some issues associated with managing and creating COW devices include: fragmentation, predicting size of COW devices in advance, optimal use of disk space, etc.

SUMMARY

In various embodiments, techniques for copying on write are presented. More specifically, and in an embodiment, a method for maintaining a snapshot of a source volume is provided. Specifically, a write operation that is directed to a first block of data on a source volume is detected. Next, metadata associated with a sparse file of a file system is accessed for purposes of locating a second block within the sparse file. The first block of data is copied to the second block within the sparse file and the first block of data is updated on the source volume by processing the write operation.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
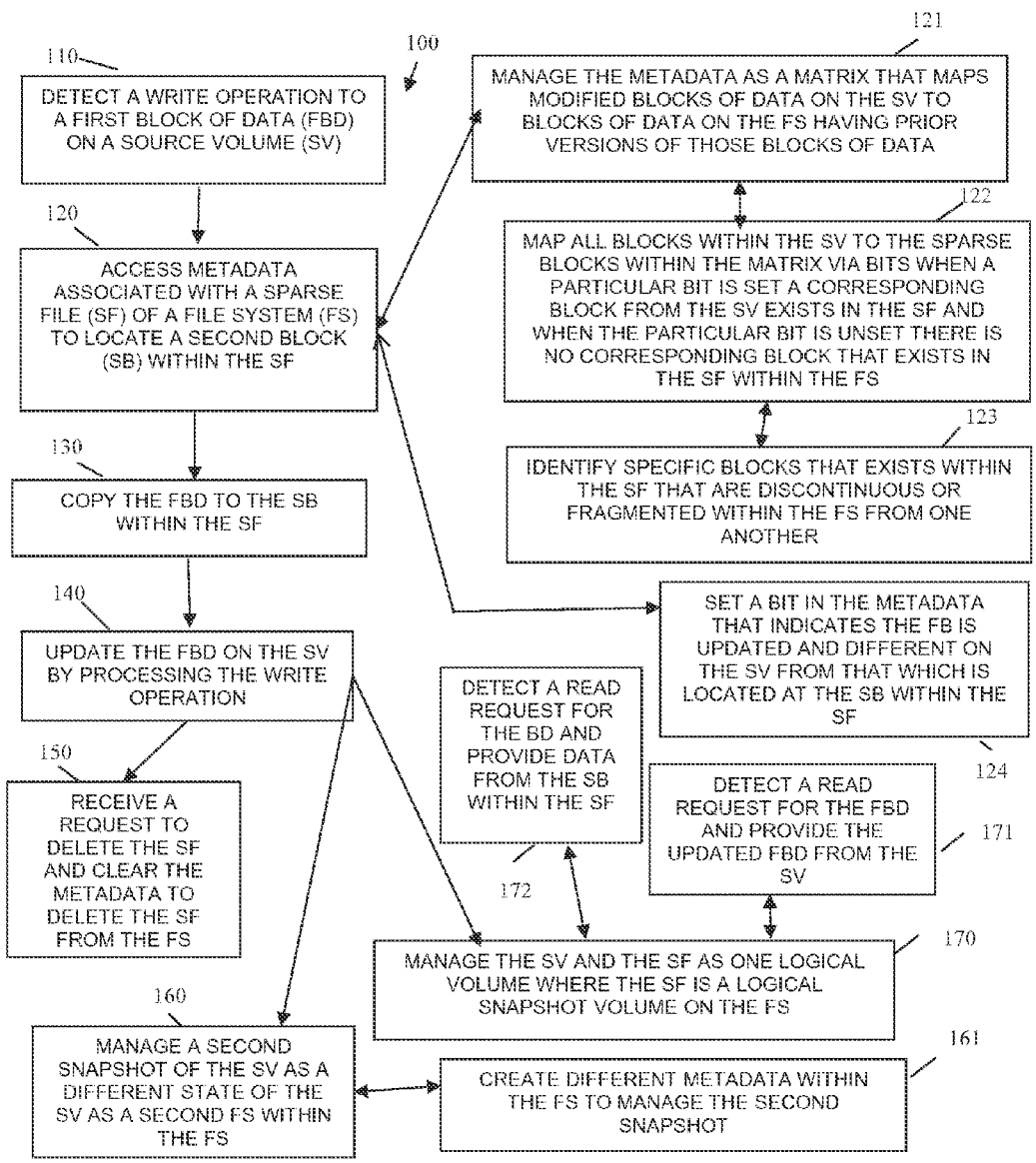
FIG. 1 is a diagram of a method for maintaining a snapshot of a source volume, according to an example embodiment.
Figure 2:
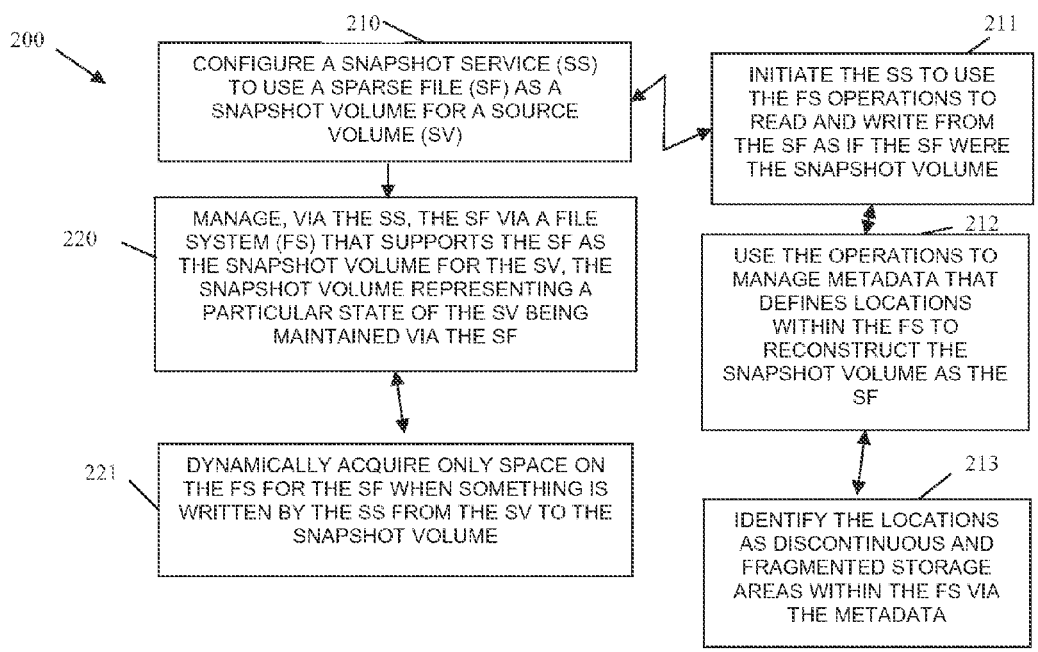
FIG. 2 is a diagram of another method for providing snapshot services on copying on write operation within a file system, according to an example embodiment.
Figure 3:
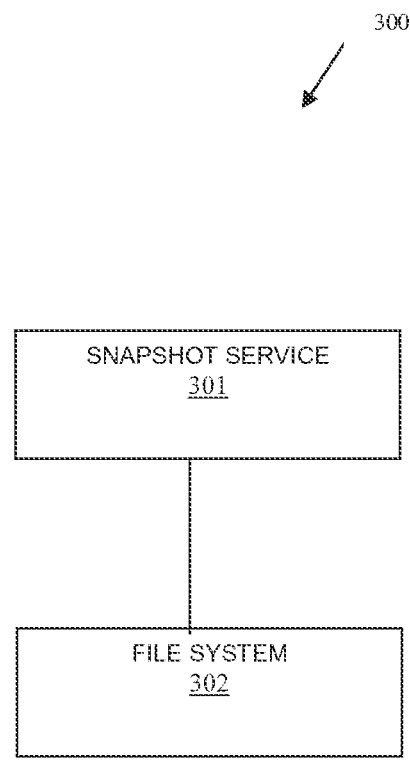
FIG. 3 is a diagram of a copying on write snapshot system, according to an example embodiment.

It is within this context that embodiments of the invention are now discussed within the context of FIGS. 1-3.

FIG. 1 is a diagram of a method 100 for maintaining a snapshot of a source volume, according to an example embodiment. The method 100 (hereinafter "copy-on write (COW) service") is implemented in a non-transitory machine-accessible and computer-readable storage medium as instructions that execute on one or more processors (machines, computers, processors, etc.). The machine is specifically configured to process the COW service. Furthermore, the COW service is operational over and processes within a network. The network may be wired, wireless, or a combination of wired and wireless.

At 110, the COW service detects a write operation to a first block of data on a source volume. In other words, a volume is being actively snapshotted and is being monitored and some volatile operation is issued for data located at the first block. Typically, in a normal snapshot process the first block of data would be written to a second block on a second volume that is being used as a snapshot of the source or origin volume. However, with the teachings presented herein the second or snapshot volume is not a volume set aside for snapshotting; rather, the second volume is a logical volume constructed as a sparse file using the file system.

Thus, at 120, the COW service accesses metadata associated with a sparse file of a file system to locate a second block of data defined and contained within the sparse file. A sparse file uses metadata to define unused space rather than actually reserving and occupying unused space. So, the file system supports the notion of a sparse file and the metadata for the sparse file defines the space needed for the snapshot volume of the source volume but does not actually write or use empty space not in use by the snapshot volume. As used herein the phrase "sparse file" and "snapshot volume" may be used interchangeably because the sparse file is effectively being managed and used as a snapshot volume for the source volume.

According to an embodiment, at 121, the COW service manages the metadata as a matrix that maps blocks of data on the source volume to blocks of data on the file system having prior versions of those blocks of data. In other words, when a block of data is modified or updated in some manner (can include deleted-any volatile operation) on the source volume, the previous pre-update state or version of the data being modified is written to a block defined in the sparse file. The mapping of modified and unmodified blocks is defined via the matrix (metadata).

Continuing with the embodiment of 121 and at 122, the COW service maps all blocks within the source volume to sparse blocks within the matrix via bits or via a bit flag for each block. So, when a particular bit is set a corresponding block from the source volume exists in the sparse file. Conversely, when a particular bit is unset then there is no corresponding block that exists in the sparse file within the file system. In other words, only modified or previous versions of the data are recorded and housed in the sparse file, if something is unmodified from the source volume it does not have to have empty space recorded in the sparse file at all.

Continuing with the embodiment of 122 and at 123, the COW service identifies specific blocks that exist within the sparse file that are discontinuous or fragmented within the file system from one another. Here, the sparse file is a fragmented file that spans multiple discontinuous locations within the file system and the metadata helps properly reconstruct and re-assemble as needed the sparse file to acquire the snapshot of the source volume.

In another case, at 124, the COW service sets a bit in the metadata that indicates the first block is updated and different on the source volume from that which is located at the second block within the sparse file. Again, the metadata provides a mapping via its location within the metadata structure to a spot on the file system where the second block is to be found within the sparse file. That second block is a prior pre-updated version of the first block of data as it appears on the source or origin volume.

At 130, the COW service copies the first block of data to the second block within the sparse file. That is, before the first block of data is modified or updated, via some volatile operation detected at 110, the COW service takes the contents of the first block of data as it appears before modification and writes it to a second block within the sparse file. So, the source volume and the sparse file combine to provide snapshot services to users or consumers of the source volume by maintaining states of the source volume via the sparse file. This is the copy on write process used for snapshotting; however, what is different is an entire second snapshot volume is not reserved and being used rather a dynamically mapped and modified sparse file is used as a logical snapshot volume and existing file system operations are used to manage the metadata of that defines the sparse file.

At 140, the COW service updates the first block of data on the source volume by processing the write (volatile) operation. Once the prior version of the first block of data is recorded in the sparse file at the second block, the update to the first block of data on the source volume can occur. So, if the source volume was in the process of being backed up when the volatile write operation was issued by a user, the source volume is still capable of being backed up via the sparse file's second block of data while the user continues to access and modify the source volume. This provided uninterrupted access to the source volume even during a backup scenario. This is but one example of the benefits associated with snapshotting, others include version control and the like.

According to an embodiment, at 150, the COW service receives a request to delete the sparse file. So, the snapshot is being cleared from the file system. Here, the COW service clears the metadata to delete the sparse file from the file system. That is, only the definition of what comprises the sparse file (metadata) needs to be removed. This is more efficient then clearing a volume out for the next snapshot.

In another case, at 160, the COW service manages a second snapshot of the source volume as a different state of the source volume. The different state and second snapshot is managed by the COW service as a second sparse file within the file system. Each different state or version of the source volume can be managed via the file system as a different sparse file.

Continuing with the embodiment of 160 and at 161, the COW service creates different metadata within the file system to manage the second snapshot. In other words, the second or different sparse file is managed via a different set of metadata via operations supported via the file system.

In an embodiment, at 170, the COW service manages the source volume and the sparse file as one logical volume where the sparse file is a logical snapshot volume on the file system. This has been explained in detail above. The prior-state versions of the data from the source file are recorded dynamically and as needed within the sparse file and the metadata describes the locations and details for access the sparse file. The file system supports sparse files and sparse file operations so normal file system operations can be performed to managing the snapshot volume.

Continuing with the embodiment of 170 and at 171, the COW service detects a read request from the first block of data and provides the updated first block of data from the source volume. Here, the read request is directed to the most-recent version of the first block of data which is consistently maintained in the first block of data on the source volume.

An alternative to the embodiment of 171 and at 172 is where the COW service detects a read request for the first block of data and provides data located at the second block within the sparse file. Here, the read request is directed to a specific-version or state of the first block of data, which is actively maintained in the sparse file via the second block of data.

FIG. 2 is a diagram of another method 200 for providing snapshot services on copying on write operation within a file system, according to an example embodiment. The method 200 (hereinafter referred to as "snapshot manager") is implemented within and resides within a non-transitory computer-readable storage medium and executes on one or more processors of a network. The network can be wired, wireless, or a combination of wired and wireless.

The snapshot manager is another and different perspective of the COW service represented by the method 100 of the FIG. 1.

At 210, the snapshot manager configures a snapshot service to use a sparse file as a snapshot volume for a source volume. In some cases, the snapshot service is the COW service represented by the method 100 of the FIG. 1 and discussed in detail above.

According to an embodiment, at 211, the snapshot manager initiates the snapshot service to use the file system operations for reading and writing from the sparse file as if the sparse file were the snapshot volume. In other words, the snapshot service uses file system operations to manage the sparse file as the snapshot volume.

Continuing with the embodiment at 211 and at 212, the snapshot manager uses the file system operations to manage metadata that defines locations within the file system to reconstruct and dynamically assemble the snapshot volume as the sparse file. So, at 213, the snapshot manager can identify locations as being discontinuous and fragmented storage areas within the file system, via the metadata.

At 220, the snapshot manager manages the sparse file via a file system that supports the sparse file as the snapshot volume. The snapshot volume is for the source volume and the snapshot volume represents a particular state of the source volume that is being actively and dynamically maintained via the sparse file.

In an embodiment, at 221, the snapshot manager only dynamically acquires space on the file system for the sparse file when something is written by the snapshot service from the source volume to the snapshot volume. So, empty space is not written to the sparse file although the empty space is identified and described via the metadata. This alleviates a lot of processing that normally would have to take place for snapshot volumes.

FIG. 3 is a diagram of a copying on write (COW) snapshot system 300, according to an example embodiment. The COW snapshot system 300 is implemented within and resides within a non-transitory computer-readable storage medium and executes on one or more processors of a network. The network may be wired, wireless, or a combination of wired and wireless.

The COW snapshot system 300 implements, among other things, the methods 100 and 200 of the FIGS. 1 and 2, respectively.

The COW snapshot system 300 includes a snapshot service 301 and a file system 302. Each of these will now be discussed in turn.

The snapshot service 301 is implemented in and resides within a non-transitory computer-readable storage medium and executes on one or more processors of the network. The processors are configured to execute the snapshot service 301. Example processing associated with the snapshot service 301 was presented in detail above with reference to the methods 100 and 200 of the FIGS. 1 and 2, respectively.

The snapshot service 301 is configured to manage one or more snapshots of a source volume via sparse files that are created and managed via operations supported by the file system 302.

In an embodiment, the source volume includes one unique sparse file for each independent snapshot maintained by the snapshot service 301.

In one situation, each sparse file dynamically grows when written to by the snapshot service 301 on an access basis.

In yet another scenario, the snapshot service 301 defines and manages each of the sparse files via metadata that a number of the operations for the file system 302 define and manipulate.

The file system 302 is implemented in and resides within a non-transitory computer-readable storage medium and executes on one or more processors of the network. Example aspects of the file system 302 were presented above with reference to the methods 100 and 200 of the FIGS. 1 and 2, respectively.

The file system 302 includes operations or an Application Programming Interface (API) for creating and managing sparse files. The snapshot service 301 uses these operations or API to logically create and maintain a snapshot volume for the source volume, each snapshot volume represented by a single sparse file.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium that is executed by one or more processors of a network to perform the method, comprising:

detecting a write operation to a first block of data on a source volume, the source volume is being actively snapshotted;

accessing metadata associated with a sparse file of a file system to locate a second block within the sparse file, the second block is not a particular volume set aside for snapshotting;

copying the first block of data to the second block within the sparse file, the sparse file is a snapshot volume for a snapshot being performed, the first block copied before a volatile operation is performed on the first block, the source volume continues to be accessed and modified during snapshotting, and managing states of the source volume using the sparse file without reserving a snapshot file during the snapshotting by using the metadata to link locations in the source volume that have been modified to other locations within the sparse file having unmodified versions of data for the locations of the source volume, wherein the snapshot file is not set aside and is not used at all when creating and managing the snapshot as the sparse file; and updating the first block of data on the source volume by processing the write operation.

2. The method of claim 1 further comprising, receiving a request to delete the sparse file and clearing the metadata to delete the sparse file from the file system.

3. The method of claim 1 further comprising, managing a second snapshot of the source volume as a different state of the source volume as a second sparse file within the file system.

4. The method of claim 3, wherein managing further includes creating different metadata within the file system to manage the second snapshot.

5. The method of claim 1 further comprising, managing the source volume and the sparse file as one logical volume where the sparse file is a logical snapshot volume on the file system.

6. The method of claim 5 further comprising, detecting a read request for the first block of data and providing the updated first block of data from the source volume.

7. The method of claim 5 further comprising, detecting a read request for the first block of data and providing data from the second block within the sparse file.

8. The method of claim 1, wherein accessing the metadata further includes managing the metadata as a matrix that maps modified blocks of data on the source volume to blocks of data on the file system having prior versions of those blocks of data.

9. The method of claim 8, wherein accessing further includes mapping all blocks within the source volume to sparse blocks within the matrix via bits wherein when a particular hit is set a corresponding block from the source volume exists in the sparse file and when the particular bit is unset there is no corresponding block that exists in the sparse file within the file system.

10. The method of claim 9, wherein mapping further includes identifying specific blocks that exist within the sparse file that are discontinuous or fragmented within the file system from one another.

11. The method of claim 1, wherein accessing further includes setting a bit in the metadata that indicates the first block is updated and different on the source volume from that which is located at the second block within the sparse file.

12. A method implemented and residing within a non-transitory computer-readable storage medium that is executed by one or more processors of a network to perform the method, comprising:
  configuring a snapshot service to use a sparse file as a snapshot volume for a source volume, the source volume is being actively snapshotted and the sparse file is not a particular volume set aside for snapshotting; and
  managing, via the snapshot service, the sparse file via a file system that supports the sparse file as the snapshot volume for the source volume, the snapshot volume representing a particular state of the source volume being maintained via the sparse file, the sparse file defining unused space within the file system, a portion of which is logically defined as the snapshot volume, and volatile operations on the source volume are processed during snapshotting affected data copied to the sparse file before the volatile operations proceed, and managing states of the source volume using the sparse file without reserving a snapshot file during the snapshotting by using metadata to link locations in the source volume that have been modified to other locations within the sparse file having unmodified versions of data for the locations of the source volume, and wherein the snapshot file is not set aside and is not used at all when creating and managing the snapshot as the sparse file.

13. The method of claim 12, wherein configuring further includes initiating the snapshot service to use the file system operations to read and write from the sparse file as if the sparse file were the snapshot volume.

14. The method of claim 13, wherein initiating further includes using the operations to manage the metadata that defines locations within the file system to reconstruct the snapshot volume as the sparse file.

15. The method of claim 14, wherein using further includes identifying the locations as discontinuous and fragmented storage areas within the file system via the metadata.

16. The method of claim 12, wherein managing further includes only dynamically acquiring space on the file system for the sparse file when something is written by the snapshot service from the source volume to the snapshot volume.

17. A multiprocessor-implemented system, comprising:
  a snapshot service implemented in and residing within a non-transitory computer-readable storage medium and to execute on one or more processors of a network; and
  a file system implemented in and residing within a non-transitory computer-readable storage medium and to execute on one or more processors of the network;
  the snapshot service configured to manage one or more snapshots of a source volume via sparse files that are created and managed via operations of the file system, the sparse files defining unused space within the file system that logically defines the one or more snapshots and the source volume is being actively snapshotted and the sparse files are not particular volumes set aside for snapshotting, and volatile operations on the source volume are processed during snapshotting affected data copied to the sparse files before the volatile operations proceed, and states of the source volume are managed using the sparse files without reserving a snapshot file during the snapshotting by using metadata to link locations in the source volume that have been modified to other locations within the sparse files having unmodified versions of data for the locations of the source volume, and wherein the snapshot file is not set aside and is not used at all when creating and managing the snapshots as the sparse files.

18. The system of claim 17, wherein the source volume includes one unique sparse file for each snapshot maintained by the snapshot service.

19. The system of claim 17, wherein each sparse file dynamically grows when written to by the snapshot service on an access basis.

20. The system of claim 17, wherein the snapshot service defines and manages the sparse files via the metadata that a number of the operations define and manipulate.

* * * * *

UNITED STATES PATENT AND TRADEMARK OFFICE
CERTIFICATE OF CORRECTION

PATENT NO. : 8,880,820 B2  
APPLICATION NO. : 12/877186  
DATED : November 4, 2014  
INVENTOR(S) : Gosukonda Naga Venkata Satya Sudhakar Page 1 of 1

It is certified that error appears in the above-identified patent and that said Letters Patent is hereby corrected as shown below:

On the Title Page, in column 2, Item -56- under "Other Publications", line 2, delete "SErver" and insert --Server--, therefor In the Claims In column 7, line 18, in Claim 9, delete "hit" and insert --bit--, therefor Signed and Sealed this  
Twenty-eighth Day of April, 2015

Michelle K. Lee  
*Director of the United States Patent and Trademark Office*